(No Model.)

W. P. MAGREEVY.
STEAM GENERATOR.

No. 277,844. Patented May 15, 1883.

WITNESSES:
Alex Mahn
J. Buchanan

INVENTOR
William P. Magreevy
By. H. N. Jenkins
Attorney

UNITED STATES PATENT OFFICE.

WILLIAM P. MAGREEVY, OF NEW ORLEANS, LOUISIANA, ASSIGNOR OF ONE-HALF TO JOHN B. BALDWIN, OF SAME PLACE.

STEAM-GENERATOR.

SPECIFICATION forming part of Letters Patent No. 277,844, dated May 15, 1883.

Application filed November 7, 1882. (No model.)

*To all whom it may concern:*

Be it known that I, WILLIAM P. MAGREEVY, a resident of the city of New Orleans, parish of Orleans, and State of Louisiana, have invented a certain new and useful Improvement in Steam-Generators; and I do hereby declare the following to be a full, clear, and correct description of the same, reference being had to the annexed drawings, making a part of this specification.

This invention relates to certain improvements in steam-boilers; and it consists in the combination therewith of an arrangement of heating or circulating pipes having connection with the upper parts of the said boilers, and with the mud-drums thereof, as will be hereinafter fully described.

Figure 1:
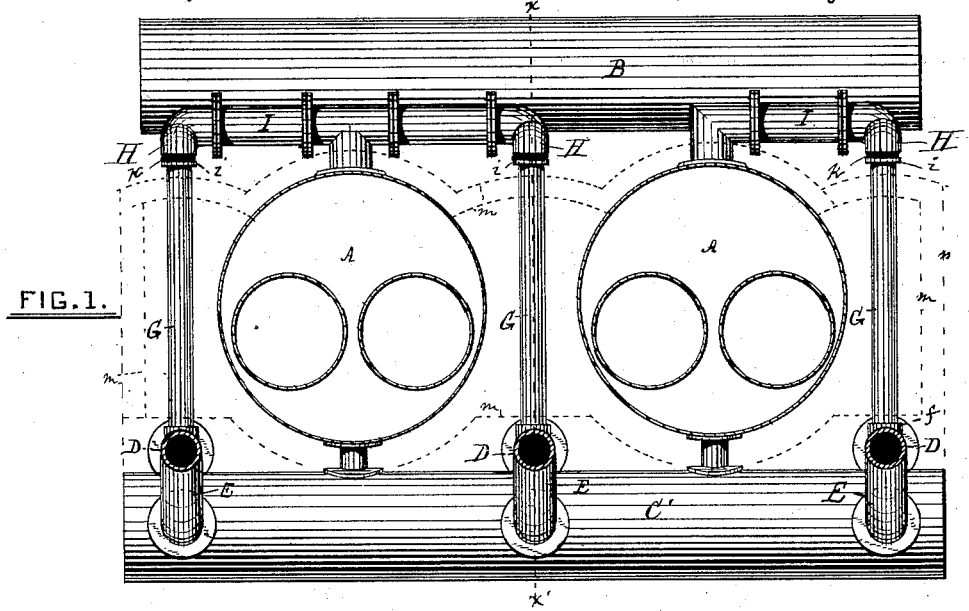
Figure 2:
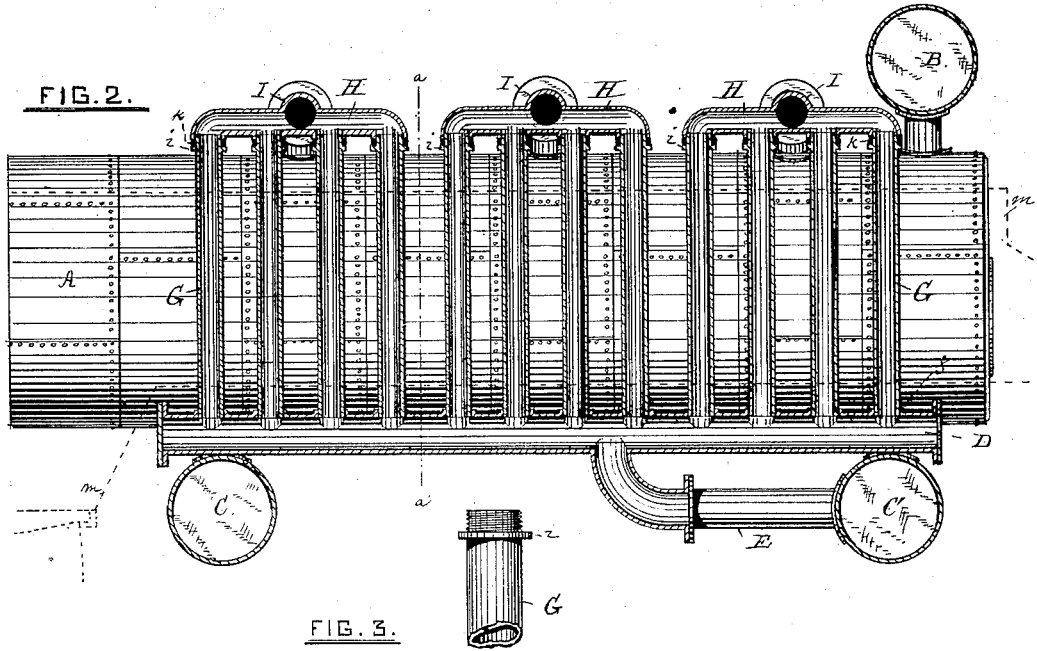
Figure 3:

On the accompanying drawings, Figure 1 represents a vertical cross-section of a pair of boilers provided with my improvements. Fig. 2 is a longitudinal section through the line $x$ $x'$ of Fig. 1; Fig. 3, an enlarged view of the opposite ends of one of the vertical pipes shown in the above figures.

On the drawings, the letter A designates the boilers, which may be of the cylindrical, flue, or tubular kind. B is a steam-drum connected with the upper parts thereof, and C C' ordinary mud-drums.

Immediately above the mud-drums, and at each side of the boiler, I employ horizontal pipes D, having pipe-connection with one of the mud-drums, as shown at E. The upper sides of the pipes D are provided with sockets $f$, to receive the lower ends of a series of vertical pipes, G, the upper ends of which connect with sectional pipes H, having discharge-branches I, which connect with the upper portions of the boiler, as shown more clearly in Fig. 1. To insure perfectly tight joints, as well as to provide for a ready disconnection of the same, the opposite ends of the vertical pipes G are made with screws thereon, and the sockets of the pipes D and H are threaded to receive the same. The upper ends of the said pipes G are furthermore provided with collars $i$, above which cement or other suitable packing is employed, so as to make perfectly steam-tight joints at the points of connection with the pipes H, as shown at K.

Although the pipe-connection is shown with but one of the mud-drums, yet it will be understood that connection can be made with both of the said drums, if so desired.

The casing or masonry inclosing the boilers should be so constructed as to exclude the pipe-joints from the direct action of the fire, the vertical pipes alone being subjected to the action of the same. The preferable line for masonry is represented in dotted lines indicated by the letter $m$; but this may be changed at the will of the engineer or party erecting the same.

Having described my invention, what I claim as new, and desire to secure by Letters Patent, is—

In combination with the boilers A, steam-drum B, and mud-drums C, the horizontal pipes D, having mud-drum connections E and sockets $f$, the series of vertical pipes G, with their independent sectional pipes H, having discharge-branches I, and the outer casing, constructed so as to exclude the pipe-joints from the action of the fire, substantially as and for the purpose set forth.

In testimony whereof I hereunto sign my name.

WILLIAM P. MAGREEVY.

In presence of—
JOS. MURPHY,
P. J. FINNEY.